(No Model.) 2 Sheets—Sheet 1.
F. L. HIGGINS.
BALL BEARING ROLLER COG WHEEL.
No. 594,110. Patented Nov. 23, 1897.
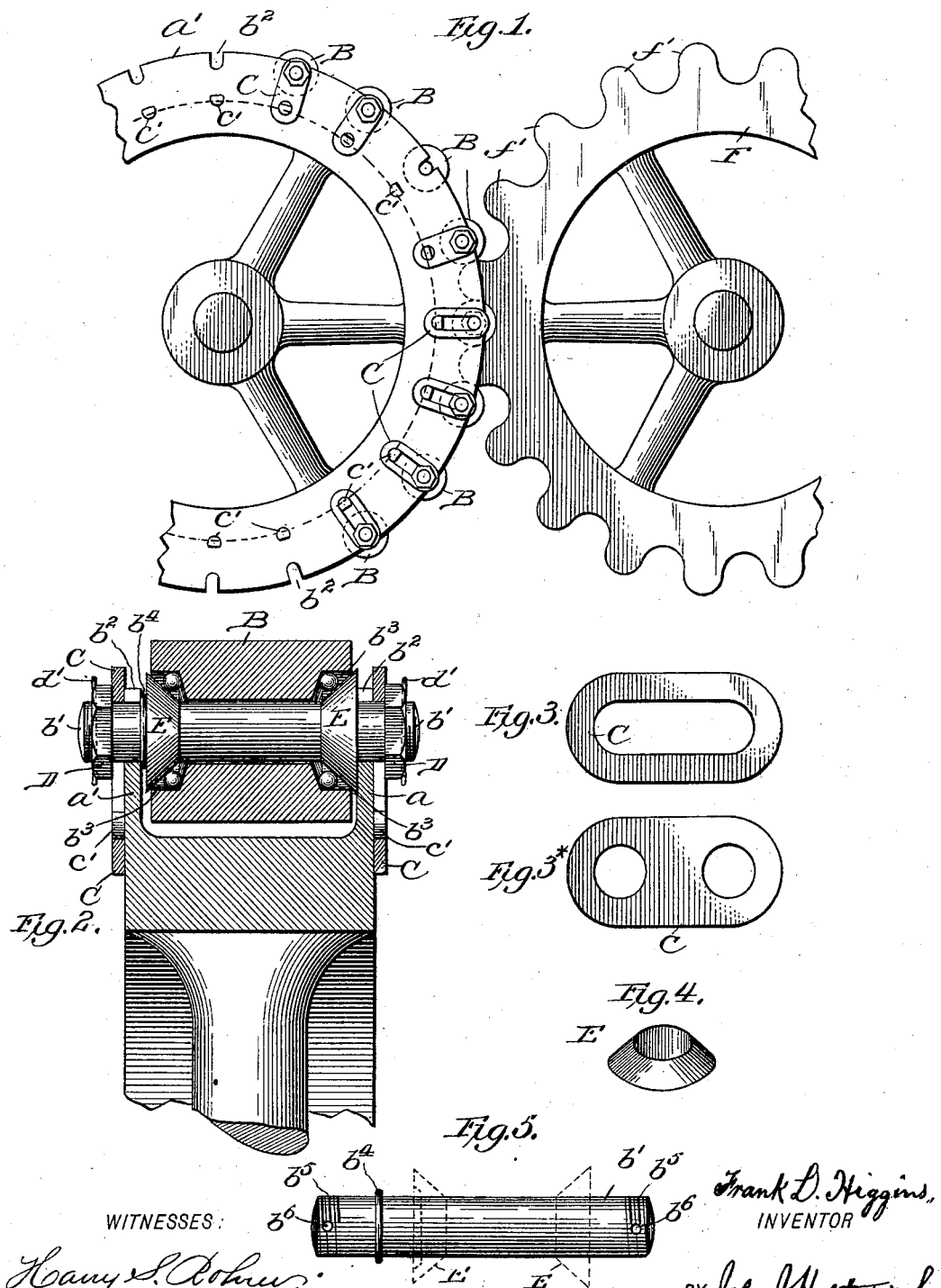

(No Model.) 2 Sheets—Sheet 2.
F. L. HIGGINS.
BALL BEARING ROLLER COG WHEEL.
No. 594,110. Patented Nov. 23, 1897.
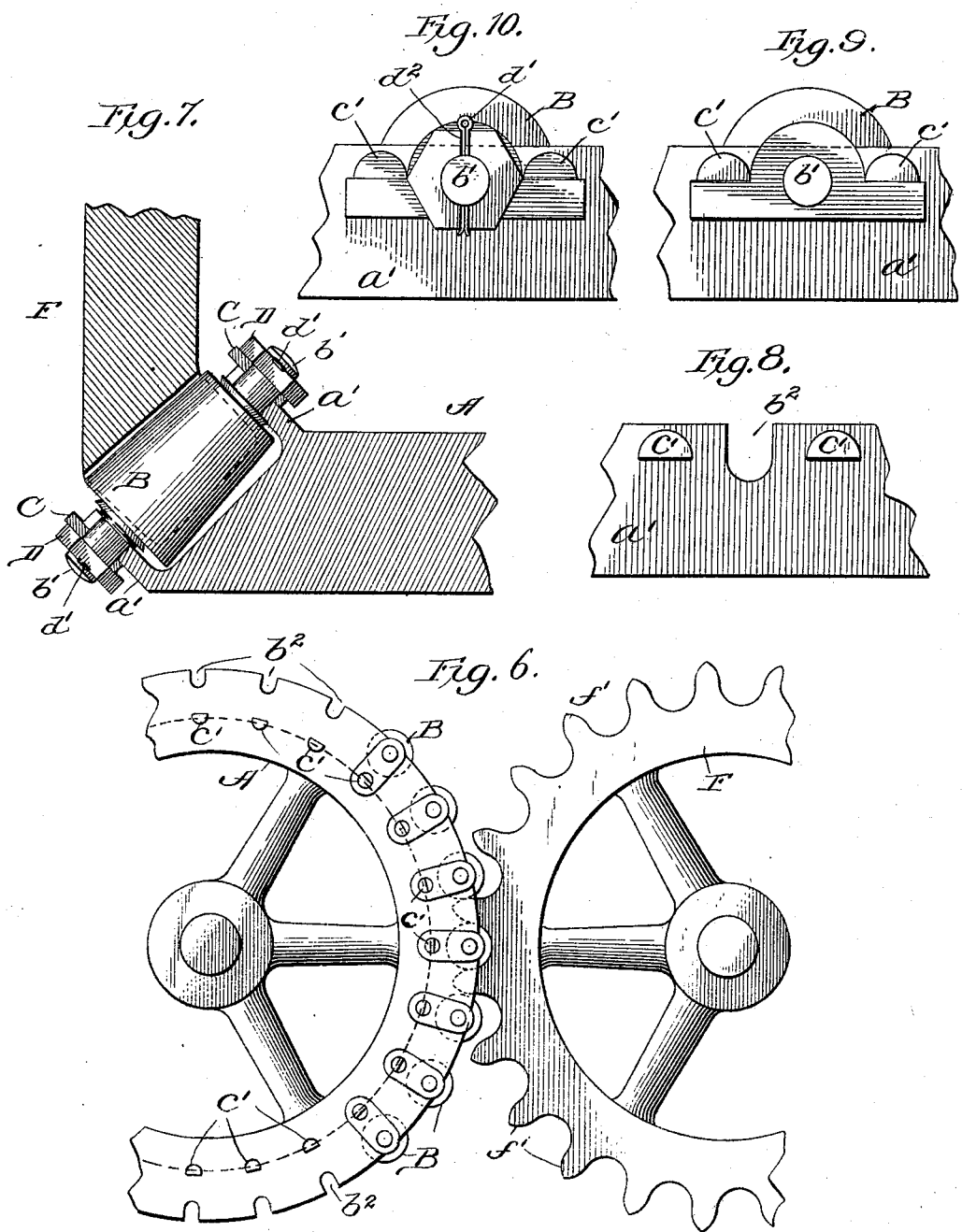
WITNESSES:
INVENTOR
Frank L. Higgins,
BY John J. Halsted & Son
his ATTORNEYS.

UNITED STATES PATENT OFFICE.

FRANK L. HIGGINS, OF WINTHROP, MASSACHUSETTS, ASSIGNOR OF ONE-HALF TO FRED H. BURDETT, OF WOBURN, MASSACHUSETTS.

BALL-BEARING ROLLER-COG WHEEL.

SPECIFICATION forming part of Letters Patent No. 594,110, dated November 23, 1897.

Application filed February 16, 1897. Serial No. 623,638. (No model.)

*To all whom it may concern:*

Be it known that I, FRANK L. HIGGINS, of Winthrop, in the county of Suffolk and State of Massachusetts, have invented certain new and useful Improvements in and Relating to Ball-Bearing Roller-Cog Wheels; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to novel devices and combinations of devices in ball-bearing roller-cog wheels, the roller-cogs having concaved ends to receive the balls.

One object of my invention, as in other roller-cog wheels, is largely to reduce or minimize friction and prevent the loss of power, the invention being applicable to plain, miter, or beveled wheels.

In the accompanying drawings, Figure 1 illustrates a sufficient portion to show the invention of my improved roller-cog wheel in engagement with a portion of a companion wheel revolving in the same plane, it being understood, of course, that the relative sizes of the two wheels may be such as occasion may require. Fig. 2 represents, enlarged, one of the metal roller-cogs for said wheel, cylindrical in form and with its axle ends of equal diameter. It also shows the flanges of the wheel for holding the rollers in sockets in such flanges and a central longitudinal section of one of the rollers, showing its central bore and its end chambers or concave seats for the ball-bearing cones or devices. Figs. 3 and $3^\times$ indicate two forms of an elongated collar, one end of which serves also as a washer for the nut. Fig. 4 shows one of the spindle-cones detached; Fig. 5, one of the spindles enlarged; Fig. 6, a view of the wheels with the roller-cogs closer together and with a corresponding slight difference in the form of the cogs in its companion wheel; Fig. 7, a fragmentary and enlarged view of the wheels when placed at right angles to each other; Figs. 8, 9, and 10, enlarged details showing the lugs and roller-supporting devices slightly varied.

In constructing a ball-bearing roller-cog wheel I first provide a wheel A, having at its outer rim or perimeter two flanges $a'$ $a'$, in the space between which the roller-cogs B, by means of their axles or spindles $b'$, are to be severally held to their proper relative positions, each of said axles $b'$ being first lodged in sockets $b^2$, made for this purpose in the edges of said flanges. These roller-cogs are each tubular, as shown, and are furnished with ball-bearing cones, presently to be described, and have at each end a recess or concave seat $b^3$ to receive and accommodate these ball-bearing devices and to hold the balls to place. The axles $b'$, on which the roller-cogs are to revolve freely, are, as shown, made long enough not only to enable their two ends to project beyond the two sustaining-flanges $a'$ $a'$ of the wheel, but also to allow room on each of these ends for a washer or collar C and for a nut D, that is to be locked by a spring-key $d'$.

E indicates the adjustable or movable ball-bearing metal cones, the balls having their bearings against the concave seats $b^3$ in the ends of the roller.

In Figs. 2 and 5 the roller axle or spindle shows an annular projection or bead $b^4$, formed on the axle $b'$, and which surrounds and is an integral part of said axle. This bead serves as a shoulder to the movable left-hand cone and to hold it in place against the outward thrust of the balls caused by pressure exerted on them by the roller which the axle supports. If, as may be in some cases, the cone itself be fixed upon the axle, or constructed upon and made of the same piece of metal as the axle, then the bead $b^4$ would not be required. The point of resistance provided for the other cone is the inner face of the flange, against which its face can be drawn by the tightening of the nut D on the end of the axle.

On each of the ends of the axle $b'$ are cut screw-threads $b^5$, adapted to receive the nuts D, which are to hold the axles in place. Diametrically through the extreme ends of each axle are eyes or holes $b^6$, provided to receive the steel spring-keys $d'$, (see Fig. 10,) made of any suitable form to serve the duty of locking the nuts in place upon each axle. As shown, these nuts D are made with a groove or crease $d^2$, cut diametrically across their outer face and extending across the threaded hole of the nut. Within this groove the spring-key $d'$, that passes through the eye $b^6$ in the axle, rests, thus locking the nut. The collars C, which are elongated instead of circular, being each at one of its ends placed over an end of the axle and at its other end hooked to a restraining-lug $c$ on the flange of the wheel, hold the ball-bearing cog firmly in its socket in the edges of the wheel-flanges. This collar also serves as a washer for the nut.

In a wheel that is to revolve in the same plane with its companion wheel the flanges will be equal to each other and project at right angles to the axle of the wheel. The purpose of the two flanges being to afford rests or seats for the axles of the roller-cogs the distance which they should project from the wheel must in every case be sufficient to allow these roller-cogs held between them to revolve freely on their axles when the latter are placed and secured in their seats or notches. The notch rests or seats of the axles may be either cast in or cut out of the outer edge of the flanges, and the width of these seats at the outer edge of the flange should be equal to the diameter of the roller-cog axle. The object of making these axle-seats open at the edge of the flanges is to permit the ready placing of the roller axles or spindles $b'$, with their rollers properly mounted upon them, into position in their seats.

The lugs $c'$ should be severally located, preferably, upon the flange and at a point directly in a line between each of the axle-seats and the center of the wheel and at a proper distance from the inner edge of each axle-seat. These lugs furnish anchorage or points of resistance for the long collars C, one end of each of such collars being placed over a lug and the other end over the end of an axle $b'$, one collar at each of its ends. In this way the axles are firmly held in their seats and against all force, centrifugal or otherwise, tending to throw them outwardly. The collars C will themselves be held securely in place by means of the nuts D, these nuts also serving in the place of washers.

As no special ball-bearing or roller-cog is required in the other or companion wheels F, I will now describe briefly the form of their cogs with reference to a pair of wheels revolving in the same plane. These cogs are, as usual in cog-wheels, fixed on or integral with the body of the wheel; but in order to properly harmonize their form with the roller-cogs and to have them work in unison therewith they may be semicylindrical on their outer or operative surfaces, as shown at $f'$ in Fig. 1, and the radius of these fixed cogs may be the same as that of the roller-cogs of the companion wheel. When, however, as in Fig. 6, the roller-cogs are closer together and, say, about one-fifth more in number for the same-sized wheel, the teeth of the companion wheel F will also be correspondingly closer together and be of about the form shown in said Fig. 6.

In bevel-gears made according to my invention the two flanges $a'$ $a'$ will incline toward the body of the wheel, but still be parallel to each other. A line drawn to touch the edges of these flanges would be about at forty-five degrees to a line drawn through the axle of the wheel when the two wheels are of the same diameter; but the angle of this line may vary according to the relative sizes of the roller-cog wheel and of its companion wheel. In the bevel-gears the roller-cogs must of course have their axes in an inclined direction, (see Fig. 7,) resting, as they must, in the notches of the inclined flanges, and the rolling cogs must each be in the form of a truncated cone the apex of which, if projected, would coincide with the point of intersection of the projected lines of the axes of the two wheels. In the companion bevel-wheel for such bevel-gears the outer portion of the fixed cogs will be necessarily somewhat in the form of the half of a truncated cone instead of that of a half-cylinder, but of the same radius at a given point as the radius at the corresponding point in the conical roller-cog.

In Figs. 8, 9, and 10 the collar C is of somewhat different form, and its ends are held under two lugs $c'$ $c'$ on the wheel, located one on each side of the roller-axle $b'$.

I claim as new—

1. A roller-cog wheel having flanges, said flanges being provided with open notches or sockets at their perimeters, and rollers on axles removably lodged in such notches, the axles having threaded ends, and devices applied to such threaded ends and serving to secure the axle to the flanges, all substantially as shown and described.

2. A roller-cog wheel having lugs on its sides and notched flanges on its perimeter and the series of removable roller-cogs each cog on its own axle and separately and individually removable from the notches in the flanges, each of such axles projecting beyond the faces or sides of the wheels and held in place in said notches, combined with collars applied to these axles and lugs, all substantially as shown and described.

3. In combination with the wheel having external lugs and notched peripheral flanges, roller-cogs inwardly recessed at their ends, axles on which these cogs revolve, ball-bearing cones inserted in said recesses, balls for said recesses and bearing upon the cones, and collars or washers for securing these parts in place on the wheel by means of said lugs, all substantially as shown and described.

4. In combination with the wheel having external lugs and two peripheral flanges notched as described, the recessed roller-cogs having each an axle lodged in said flanges and projecting beyond the same, the bead on such axle, the ball-bearing cones, nuts on the axles, and elongated collars or washers holding the axles to the lugs on the flanges or wheels, all substantially as set forth.

5. In combination with the wheel having external lugs and two peripheral flanges notched as described, the recessed roller-cogs having each an axle lodged in said flanges and projecting beyond the same, the bead on said axle, the ball-bearing cones, nuts on the axles, elongated collars or washers holding the axles to the lugs on the flanges of the wheels, and keys for locking the nuts in place, all substantially as shown and described.

6. In combination with a flanged wheel having a system of removable roller-cogs on axles held in place by means of keyed nuts and collars applied to the threaded ends of the axles outside of the wheel-flanges, a companion wheel adapted to coöperate therewith, all substantially as set forth.

7. In a bevel gear-wheel having inclined peripheral flanges and open notches in such flanges, a series of roller-cogs formed as truncated cones recessed at their ends, balls and ball-bearing cones inserted in said recesses, inclined axles for said rollers removably lodged in said open notches, and means as described for securing said axles to and outside of said flanges.

8. In combination with the roller-cog bevel-wheel and with its truncated-cone rollers provided with recessed ends for ball-bearing appliances, a companion bevel-wheel having fixed cogs whose outer parts have their contact-surfaces preferably in the form of halves of truncated cones, the respective diameters or thickness of said half-cones being preferably equal to the corresponding diameters of the roller-cogs and adapted to coöperate with them substantially as set forth.

FRANK L. HIGGINS.

Witnesses:
WARREN BELCHER,
CHAS. L. STOWELL.